United States Patent [19]

Templeton

[11] Patent Number: 6,152,029
[45] Date of Patent: Nov. 28, 2000

[54] METHOD FOR MAKING A PAPER CARD WITH PRINTED GRAPHICS AND MAGNETICALLY ENCODED STRIPE

[75] Inventor: Robert Templeton, Robbinsville, N.J.

[73] Assignee: Webcraft, Inc., Lawrenceville, N.J.

[21] Appl. No.: 09/421,794

[22] Filed: Oct. 20, 1999

[51] Int. Cl.[7] ........................ B41F 17/00

[52] U.S. Cl. ................ 101/35; 400/76; 400/70; 400/71; 400/61

[58] Field of Search ................ 101/35–36, 4; 400/76, 70, 61

[56] References Cited

U.S. PATENT DOCUMENTS

| | | |
|---|---|---|
| 4,297,570 | 10/1981 | Kowalski et al. . |
| 4,701,601 | 10/1987 | Francini et al. . |
| 4,982,346 | 1/1991 | Girouard et al. . |
| 5,200,601 | 4/1993 | Jarvis . |
| 5,326,179 | 7/1994 | Fukai et al. ........................ 400/120 |
| 5,489,763 | 2/1996 | Conrad . |
| 5,768,143 | 6/1998 | Fujimoto ........................ 364/479.05 |
| 5,941,522 | 8/1999 | Hagstrom et al. ........................ 271/225 |

Primary Examiner—John S. Hilten
Assistant Examiner—Charles H. Nolan, Jr.
Attorney, Agent, or Firm—Sidley & Austin; Hugh A. Abrams

[57] ABSTRACT

A method is provided for making a paper card with printed graphics and a magnetically encoded stripe in an in-line process. The printed graphics information is synchronized with the magnetically encoded information to provide a card with information targeted to a particular customer.

8 Claims, 4 Drawing Sheets

FIG. 3 — CARD MANUFACTURING PROCESS SEQUENCE STEPS

METHOD FOR MAKING A PAPER CARD WITH PRINTED GRAPHICS AND MAGNETICALLY ENCODED STRIPE

BACKGROUND OF THE INVENTION

This invention relates to a system and method of creating a paper card with a magnetically encoded stripe, in a continuous, single pass fashion. The method produces a card that includes an encoded magnetic stripe, related variable imaging, and printed graphics on a paper substrate. The card is a durable and inexpensive alternative to the plastic cards typically used as temporary permits and identification, gift certificates, membership and affinity cards and the like.

Previous methods of providing such products utilized a number of separate manufacturing steps. Typically, the card was printed, then placed on a cardboard carrier and skin-packed. The bar-code on the back of the card was read through a cut-out in the carrier, and a magnetic slurry stripe was written with the correct data.

Prior methods of applying magnetic stripe information typically involved piece-by-piece encoding of the stripe. There is a need for a system that permits in-line printing and encoding of graphic, bar code, magnetic stripe and other information with information targeted for customers. Moreover, there is a need for such a card in which customer information can be included in both the graphics portion of the card and in the magnetically encoded stripe.

SUMMARY OF THE INVENTION

The invention is a system and method of printing and magnetically encoding a paper card on a paper substrate through use of an in-line process. The system includes synchronization of the printed information on the front side of the card with the magnetically encoded information on the back side of the card. The paper card may also be printed with graphics during the in-line formation process. The graphics also match the encoded data through a synchronization process.

In one embodiment, the process involves the unwinding of blank paper card stock from a web or supply roll. The blank stock is run through a 6 color offset printing unit where fixed presentation graphics and text are printed on the front side of each card. Variable text and bar code information may then be applied to the back side of each card by two inkjet print units. Synchronization of the text information to the graphics on the opposite side of the card is maintained by an image synchronization system. Data sequence verification is performed by a data controller known as a Universal Registration Controller (URC) which verifies the encoded data as each card is printed. Synchronization of the information between the various printers and encoders is maintained by another control system known as an Image Synchronization Controller (ISC).

Non-variable printed text and graphics may also be applied to the back of each card downstream of the inkjet units. A clear varnish coating may also be applied to the back of each card to fix the inkjet printing and enhance the appearance of the cards. If a PIN number or other security information is printed on the cards, an opaque scratch-off coating is preferably applied over this area.

A magnetic stripe of high or low coercivity magnetic media is also applied to the back of each card. This stripe has an adhesive backing that is fixed to the card stock via a hot stamp unit with heat and pressure.

One, two or three tracks of encoded data can be written on the magnetic stripe via a magnetic write head. Data sequence verification is performed by the data controller. Registration of the magnetic encoding to assure proper coding of the card is controlled by an adapted URC called a Mag/Bar Code Registration Controller (MRC). Synchronization of the encoded data to the inkjet printed data is controlled by the ISC.

The data on the magnetic stripe is also read for verification by a magnetic read head located just beyond the write head. The data is checked for content and rechecked for sequence by the data controller at this time. If a bar code was printed on the cards, a laser bar code reader located just downstream of the magnetic read head may read the contents and the data controller verifies the content for correctness and sequence.

The individual cards are then cut from the card stock by a cutter die unit and are shingled on a delivery conveyor belt or stacked in controlled batches by means of a mechanical stacking unit. When cards are shingled, break points to assist in marking packaging breaks and quality assurance pieces are facilitated by kicking, to an angled position, specific pieces on the conveyor belt. Kicking and batch control is a function of the data controller and the ISC.

It is one object of the invention to provide a system and method to produce, in a continuous in-line fashion, a magnetic encoded stripe product on a paper substrate with synchronized control of print graphics and other information on the card.

Another object of the invention is to provide a card designed to permit activation after purchase, by passing the magnetic stripe of the card through a reader at the point of sale, and to provide a method to capture customer information, track marketing efforts and generate instant customer data all relating to information stored or printed on the card.

In addition, because the printing is done on a web, the cards can be in the form of a large document with increased area for promotional messages and images.

BRIEF DESCRIPTION OF THE DRAWINGS

A preferred embodiment of this invention is explained with reference to the attached drawings. In the drawings.

DETAILED DESCRIPTION OF THE PREFERRED EMBODIMENTS

Figure 1:
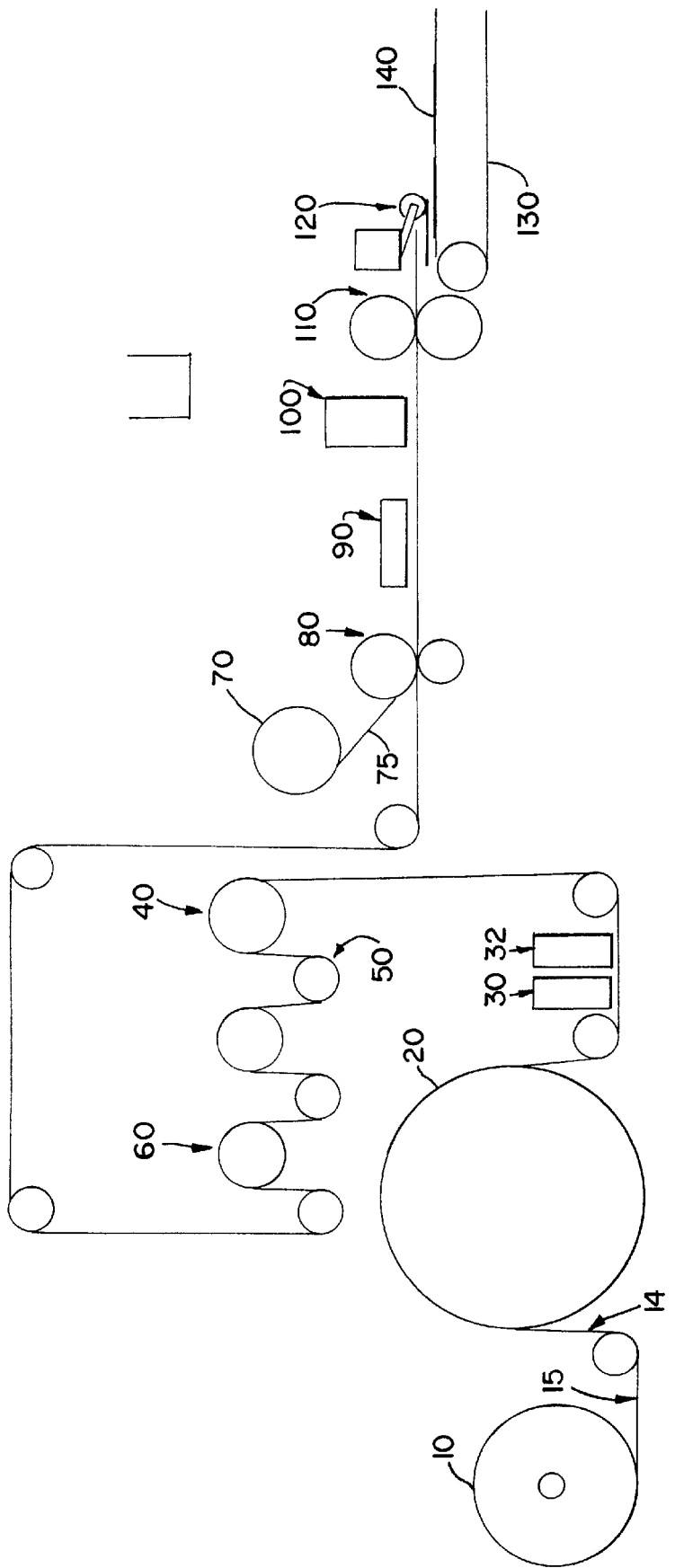
FIG. 1 is a schematic drawing of the card manufacturing process sequence of one embodiment of the present invention.

As shown in the schematic drawing illustrating the overall manufacturing sequence in FIG. 1, a supply roll 10 supplies blank paper card stock in a continuous web having a front 14 and a back 15 side. The ability to use a continuous web in an in-line process is one advantage provided by the present invention. After being unwound from the roll, the web is printed with a 6 color offset printing unit 20 where fixed presentation graphics and text are printed onto the front side 14. Two inkjet printheads 30, 32 apply variable text and bar code information to the back of the web 15.

One key feature of the present invention is the synchronization of the data or information being encoded or otherwise printed on the card. Synchronization provides information to the marketer of the card in the form of which customer actually responded by using the card and information on the card tailored to that particular customer (such as a targeted promotional offer). The system for data synchronization is described in the context of the discussion of the data registration and synchronization controller.

Non-variable printed text and graphics are applied to the opposite side of the web 15 at further print stations after the inkjet printheads 30, 32. A clear coating 50 is applied to both sides of the web to fix the inkjet printing and enhance the appearance of the card. In one embodiment, the clear coating is varnish. If a PIN number or other security information has been applied onto the web at the inkjet print station, an opaque scratch-off coating is applied at station 60 over the security information.

A premanufactured stripe 75 of low or high coercivity magnetic media is unwound from a supply roll 70 and is applied to the back 15 of the web. The stripe 75 has an adhesive backing that is fixed to the card stock by a conventional hot stamp unit 80. One, two or three tracks of encoded data are written on the stripe 75 via a magnetic write/read head assembly 90. The data on the magnetic stripe 75 is read for verification by the magnetic write/read head 90. A laser bar code reader 100 located just downstream of the magnetic head assembly 90 reads the contents of the bar code. Individual cards 140 are then cut from the continuous card stock by a cutter die 110 unit and are shingled (overlapped) on a delivery conveyor belt 130.

Figure 2:
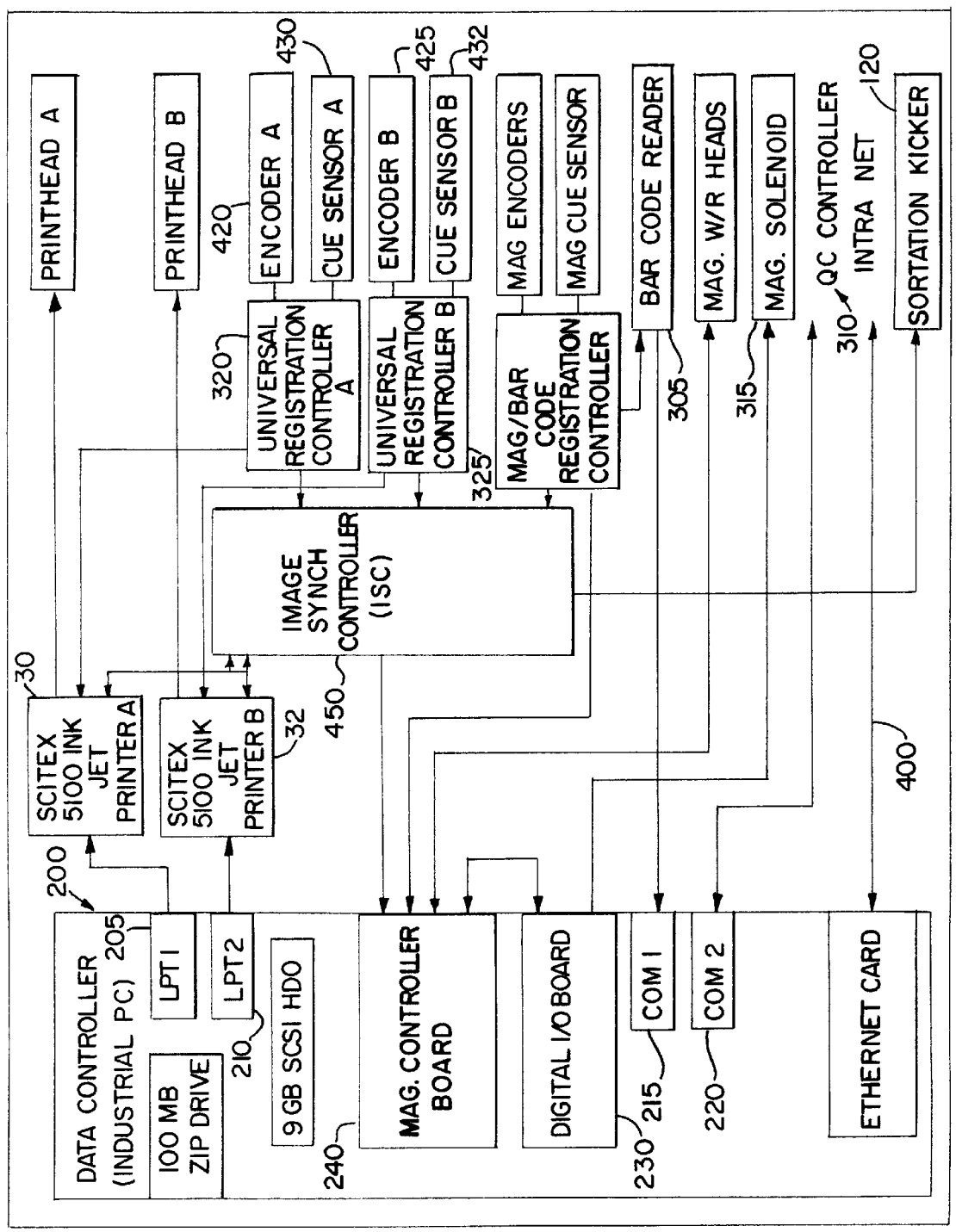
FIG. 2 is a schematic drawing of the electronic control hardware.

A schematic illustration of the electronic control system and of the present invention is shown in FIG. 2. The data controller 200 is housed in a personal computer. Data files with targeted customer information, such as names, addresses, and specific promotional information, are provided to the data controller 200 via computer disk (not shown) or an intranet 400 or internet connection. The data is encoded in specific fields for input to the controller software. Data can be supplied from marketing information to the data controller by means of a company intranet through an Ethernet card, as known in the art. The data files are read by the software in the data controller 200 and the software provides appropriate information for printing on the card to one or two inkjet printers 30, 32 (Seitex S5100 InkJet printers) that interface by a first LPT1 port 205 and a second LPT2 port 210.

In-line bar code reader 305 communicates with the data controller by the COM1 serial port 215. In this manner, bar code information printed on the card may be read and confirmed for correct sequencing by the data controller. Communications with a PC based QC controller 310 to verify the quality of the magnetic card product or other sequencing may be communicated to the data controller by the COM2 serial port 220. A 96 bit digital I/O card 230 handles control functions and data transfer to and from the Magnetic Controller Board (MCB)240 as well as control of the Magnetic Head Assembly solenoid 315 that moves the head assembly into place on the production line when encoding is active.

As mentioned above, one or two inkjet printers 30, 32 are used to apply variable printed data to each card. These printers produce text and bar codes at 120×240 dpi resolution. Variable information can be printed on the front and back of the card to identify the promotion and provide customer or merchant instructions. Bar code information can include a specific customer identification or general information such as geographic location or target market demographics. The personal identification number (PIN) under an opaque scratch-off coating provides a mechanism for validation of the card only at a particular location (i.e., card is "void" if scratch-off coating removed before redemption). Each of the identifications, such as the PIN, graphics, bar code, and magnetic stripe encoded information, can be correlated to the same data record or target customer.

The magnetic stripe may also be encoded with data or other specific information. The magnetic stripe encoded information is correlated to the printed graphics and/or printed bar code information. In contrast to the present invention, prior art systems typically apply magnetic stripes to cards that are encoded sequentially. In the present invention, the stripe is applied and encoded in-line, while synchronized to the other data information being applied to the card.

Accurate, encoder-based positioning of the variable data on the cards is controlled by Universal Registration Controllers (URC) A 320 and B 325. The inputs to the URC systems 320, 325 are 240 dpi encoders 420,430 and optical sensors 425, 432 that detect the top of each card. The URC systems 320, 325 also monitor the inkjet printers 30, 32 to assure that printing has occurred on each card that passes under the printheads. This function is critical to maintaining valid data in sequence on the cards.

Start and stop synchronization of inkjet and magnetic data imaging is controlled by the Image Synchronization Controller (ISC) 450. This subsystem provides card based delays that enable and disable printing and encoding for each device on the line. Synchronization is accomplished by coordination between sensors that identify a preprinted mark on the web. The registration controller delays or advances the web and activates the specific printers through a control system keyed to the identification of the preprinted mark. The image synchronization controller sends a signal to enable the appropriate printer so that the correct data or information is printed or encoded on the correct card. The synchronization control is able to determine a precise location for a card based on the controlled speed of the web and identification of the edge of the card upon sensing the preprinted mark. Universal Registration Controller A (320) thus controls movement of the card to printer A and printing at printer A while Universal Registration Controller B controls movement of the card to printer B and printing at printer B. Similarly, the magnetic registration controller controls the movement of the card to the magnetic encoder and encoding. Each card is still a part of the endless web at the time of printing or encoding, but is in a discrete, pre-determined location on the web.

The ISC (450) also controls sortation kicking of pieces by detecting two binary outputs from the first inkjet printer (30), providing the appropriate production line delays, to activate the sortation kicking device (120). This causes specified pieces to be delivered at an angle in the lapped stream on the conveyor (130) to facilitate accurate packaging of the product and removal of QC pieces for inspection. The ISC (450) discriminates sort kicks from QC kicks by producing an audible alert as well as a kick for QCs. The control data for sortation is automatically embedded in the printer data stream by the data controller (200) when the data is converted prior to a production run. The inkjet printers (30), (32) provide the binary sortation output as the specified pieces are being printed.

In-line magnetic card encoding is supported by a Magnetic Controller Board (MCB)(240). The data controller (200) supports single track encoding along the stripe. The insertion of additional MCB boards (240) allows simultaneous encoding of 2 or 3 tracks of card data along the stripe. The MCB (240) supports high and low coercivity magnetic media encoding by means of adding or removing a high current driver module and booster power supply.

At the point of supply to consumers the card is "swiped" through a conventional magnetic stripe terminal for reading the data previously encoded in the magnetic stripe. The terminal is connected to a central data source via telephone lines where the individual cards may be activated as valid or the data may be read for marketing information purposes. In some applications, such as telephone cards, activation through annexation to a main data source allows the cards to be displayed with less concern for theft because activation of the card takes place only after payment and connection to the central database via the swipe terminal/phone line. Household data can also be encoded into the stripe. Upon presentation of the card at a retail location or dealer, it may be swiped at a terminal into the central system and the sponsor of the offer can learn which households have responded to the offer. Other information stored on the card by bar code or magnetic stripe encoding can include customer specifics, geographies, demographics, or prior product selection information.

Figure 3:
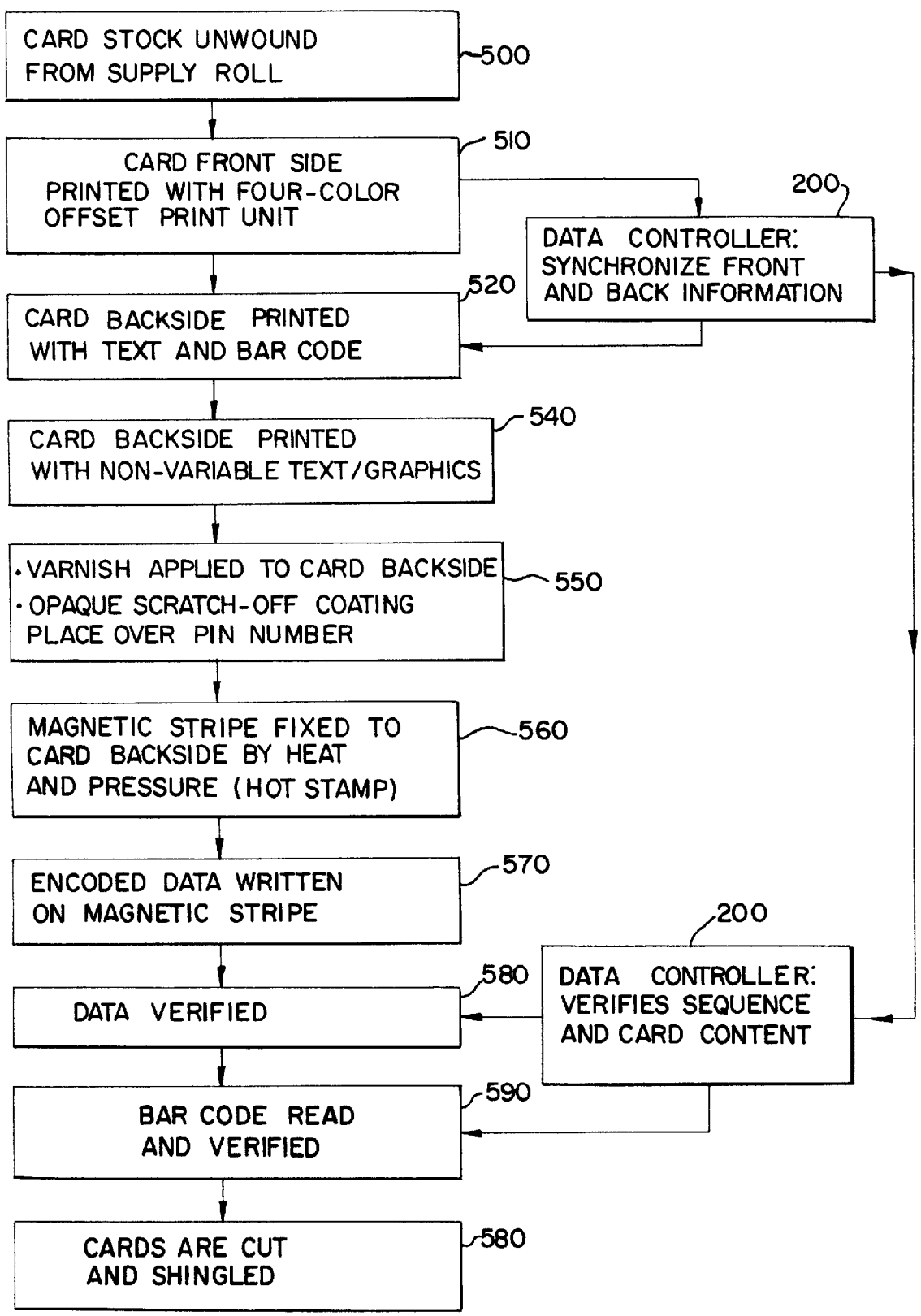
FIG. 3 is a block diagram of the process sequence steps of one embodiment of the present invention.

As shown in FIG. 3, the process of manufacturing the magnetic card begins when card stock is unwound from a supply roll 500. The front side of the card is printed by a four-color offset print unit 510 and the back side is printed with variable text and variable bar code data 520. At this time the data controller 200 synchronizes the front and back information 530. The card back is then printed with non-variable text and graphics 540. A clear coating, preferably varnish, is applied to the card and opaque scratch-off coating is placed over a section with security information such as a PIN number 550.

A magnetic stripe is affixed to the card back by a hot stamp process 560. Encoded data is then written on the magnetic stripe 570. Data encoded in the magnetic stripe is verified by the data controller 580. The bar code data is also verified at this point 590 by the data controller 200, which is shown in two locations. The cards are then cut and shingled 580 and ready for packing.

Figure 4:
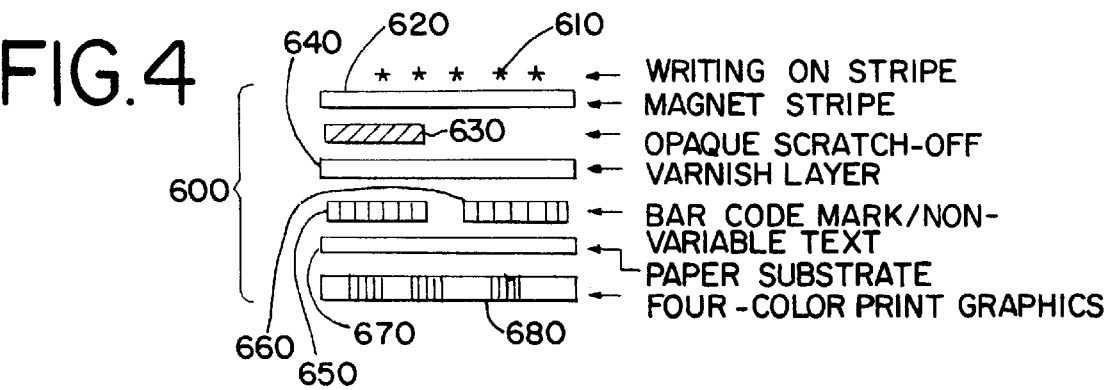
FIG. 4 is a side view illustrating the levels of printing and other encoding on a completed card of one embodiment of the present invention.
Figure 5:
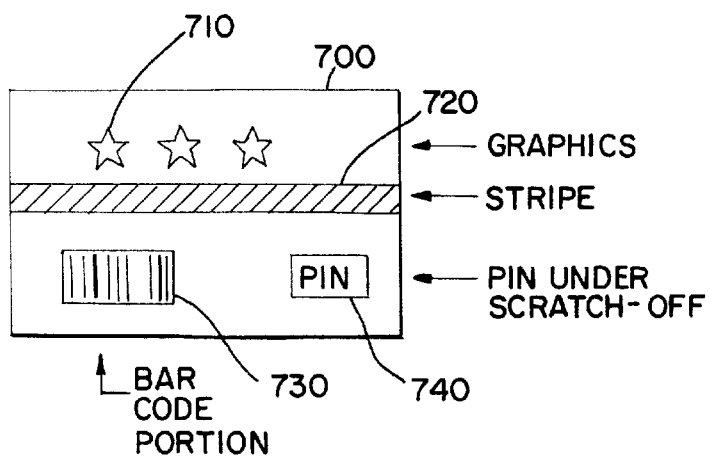
FIG. 5 is a plan view illustrating the printing and encoding on one side of the completed card of the present invention.
Figure 6:
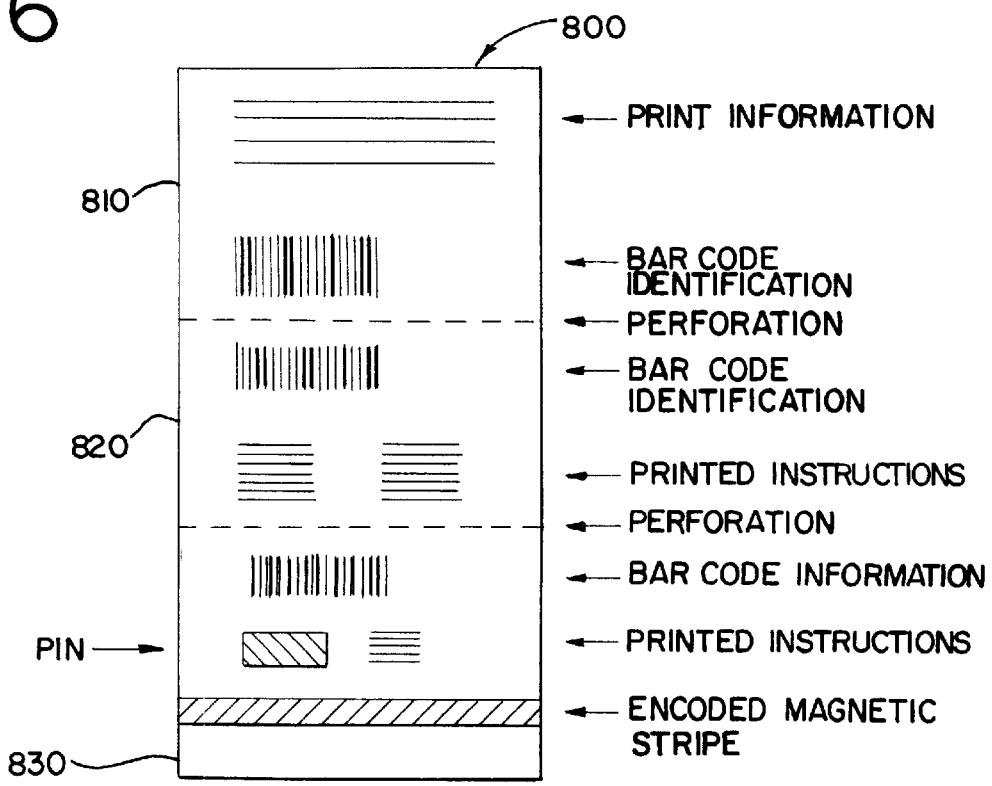
FIG. 6 illustrates a plan view of the completed card of another embodiment of the invention.

Examples of cards produced by the present invention are shown in FIGS. 4, 5 and 6. FIG. 4 illustrates the various layers of graphics or encoded information that may be applied to the card 600. These include: (a) writing on the magnetic strip 610; (b) the magnetic stripe itself 620; (c) an opaque scratch-off layer 630 to cover a PIN; (d) a varnish layer 640; (e) bar code identification marks 650; (f) non-variable text 660; (g) the paper substrate 670; and (h) four-color print graphics 680.

FIG. 5 illustrates one side of a card with the inclusion of graphics 710, a magnetic stripe 720, bar code information 730 and a PIN 740. FIG. 6 illustrates another embodiment of the card 800 in three pieces 810, 820, 830, one or more of which may be returned to the point of sale as coupons or other promotional pieces.

Those skilled in the art to which the invention pertains may make other modifications and embodiments employing the principles of this invention without departing from its spirit or essential characteristics, particularly upon considering the foregoing teachings. The described embodiments are to be considered in all respects as only illustrative and not restrictive.

What is claimed is:

1. A method for in-line manufacturing of a printed, magnetically encoded paper card, said method comprising the steps of:

providing a continuous web suitable for forming a substrate for a paper card, said web having a series of discrete locations along its face capable of being severed into a plurality of separate cards after completion of printing and encoding, providing a first input signal to a data controller from a data input device, said first input signal including data corresponding to information for printing and encoding on said cards at each of said discrete locations along said face of said web, coupling an image synchronization controller to said data controller, said image synchronization controller receiving input signals from a plurality of sensors that serially sense the speed and location of said discrete locations along said web, said image synchronization controller including a counter for identifying each of said serial discrete locations on said web and synchronizing said speed and location data with said counting data, said image synchronization controller receiving a data input signal from said data controller, said data input signal providing information corresponding to information for printing and encoding at each of said discrete locations along said web, sending a first output signal from said image synchronization controller to a first printer unit, said first output signal providing information for printing by said first printer unit, said image synchronization controller using said determination of said location and said speed of said discrete locations on said web to synchronize the information for said first printer unit with said information received by said image synchronization controller from said data controller for each of said discrete locations on said web, said printer printing graphic information at each of said discrete locations along said web, applying a magnetic stripe along one surface of said web, coupling a magnetic registration controller to said image synchronization controller, said magnetic registration controller receiving an input signal from a magnetic cue sensor to determine the speed and location of said discrete locations on said web having said magnetic stripe applied thereto, magnetically encoding information on said magnetic stripe with a magnetic encoder, said magnetic registration controller using said determination of said location and said speed of said discrete locations on said web to synchronize said information for said magnetic encoder with said information received by said image synchronization controller from said data controller for each of said discrete locations on said web, said magnetic encoder encoding information at each of said discrete locations along said web, reading said graphic information to confirm said graphic information at each of said discrete locations along said web corresponds to said information from said data input to said data controller, reading said magnetically encoded information to confirm said magnetic information at each of said discrete locations along said web corresponds to said information from said data input to said data controller, and severing said web at a point between each of said discrete locations to form said printed cards.

2. The method of claim 1 further comprising the step of printing non-variable graphics at each of said discrete locations along said web.

3. The method of claim 2 wherein said non-variable graphics are printed by a second printer unit, said second printer unit being coupled to said image synchronization controller, said non-variable graphics being coordinated with said information from said data controller for each of said discrete locations along said web.

4. The method of claim 2 further comprising the step of printing bar code information at each of said discrete locations along said web.

5. The method of claim 4 wherein said bar code information is printed by a bar code printer unit, said bar code printer unit being coupled to said image synchronization controller, said bar code information being coordinated with said information from said data controller for each of said discrete locations along said web.

6. The method of claim 1 wherein a printed, magnetically encoded paper card is formed at each discrete location along said web, said card having printed graphics, printed information and magnetically encoded information corresponding to said information from said data controller for each of said discrete locations along said web.

7. The method of claim 6 wherein said paper card may be used in a magnetic card reader coupled to said data controller so that said information encoded in said magnetic stripe may be read and coordinated with said information contained in said data controller regarding said discrete location along said web.

8. The method of claim 6 wherein said card includes a personal identification number printed by said printer, said personal identification number being coordinated to said information received in said data controller for each of said discrete locations along said web.

* * * * *